No. 610,188. Patented Sept. 6, 1898.
F. H. LIPPINCOTT.
SODA WATER APPARATUS.
(Application filed Dec. 28, 1897.)
(No Model.) 2 Sheets—Sheet 1.
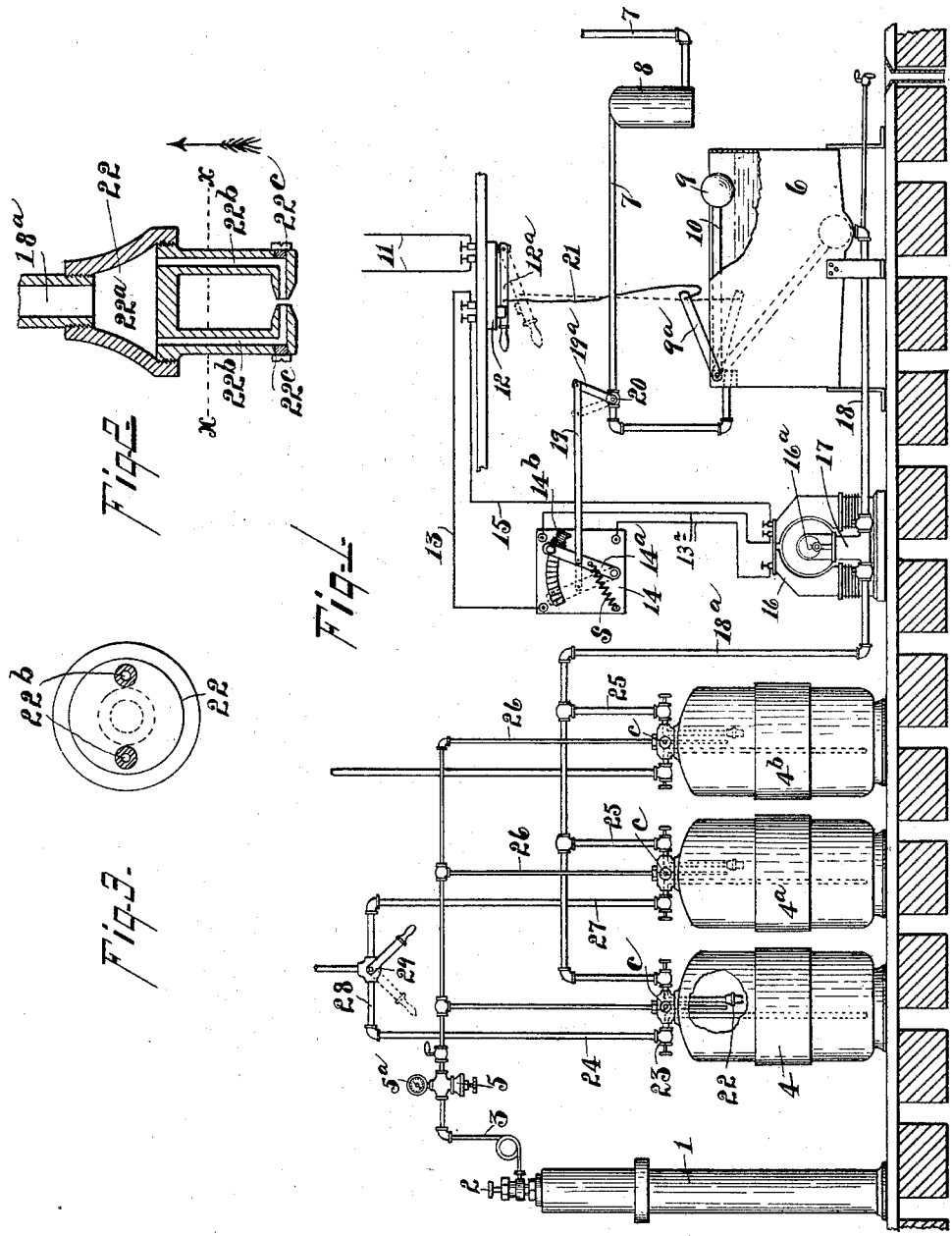
Witnesses.
Walter C. Pusey.
Isaac W. Heysinger.
Inventor
Fisher H. Lippincott,
per Joshua Pusey,
Attorney.

No. 610,188. Patented Sept. 6, 1898.
F. H. LIPPINCOTT.
SODA WATER APPARATUS.
(Application filed Dec. 28, 1897.)
(No Model.) 2 Sheets—Sheet 2.

Witnesses.
Walter C. Pusey
Isaac W. Heysinger

Inventor.
Fisher H. Lippincott,
per Joshua Pusey,
Attorney.

UNITED STATES PATENT OFFICE.

FISHER H. LIPPINCOTT, OF PHILADELPHIA, PENNSYLVANIA, ASSIGNOR TO THE AMERICAN SODA FOUNTAIN COMPANY, OF TRENTON, NEW JERSEY.

SODA-WATER APPARATUS.

SPECIFICATION forming part of Letters Patent No. 610,188, dated September 6, 1898.

Application filed December 28, 1897. Serial No. 663,843. (No model.)

*To all whom it may concern:*

Be it known that I, FISHER H. LIPPINCOTT, a citizen of the United States, residing in the city and county of Philadelphia, State of Pennsylvania, have invented certain new and useful Improvements in Soda-Water Apparatus, of which the following is a full, clear, and exact description, reference being had to the accompanying drawings, of which—

Figure 4:
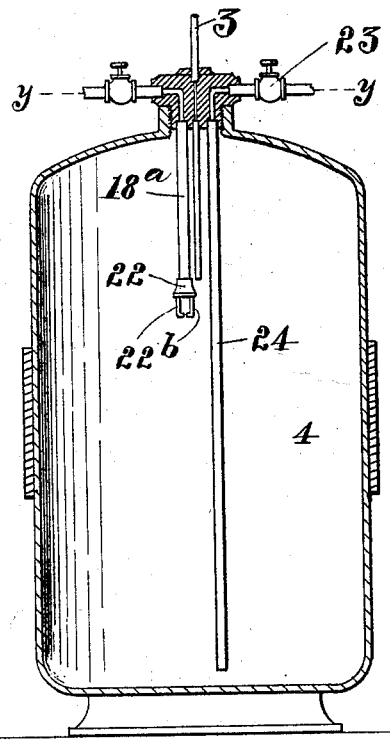
Figure 5:
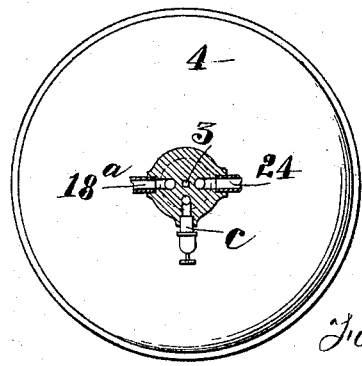

Figure 1, Sheet 1, is a general view of my invention in elevation; Fig. 2, a vertical medial section through one of the spraying devices; Fig. 3, a horizontal section on line $x\,x$, Fig. 2, looking in the direction of the arrow. Fig. 4, Sheet 2, is a vertical medial section through one of the receiving-tanks; Fig. 5, a horizontal section on line $y\,y$, Fig. 4.

This invention relates more especially to apparatus for carbonating or charging with carbonic-acid gas water for soda fountains, and has for its object to provide such an apparatus wherein a predetermined quantity of water contained in a suitable tank may be forced by a pump or the like into a receiver (containing the gas under pressure) in the form of a fine spray, and when the required quantity of water has been thus transferred from the tank to the receiver the pump shall be thrown out of action and the tank be replenished with water by certain means and devices, as hereinafter described.

The invention consists of the combination of a suitable receiver, a vessel adapted to contain gas, such as carbonic-acid gas under considerable pressure and communicating with the said receiver, a tank having a pipe connection with a source of water-supply, a valve or cock in said pipe, a suitable float in said tank, a pump for forcing water from the latter to the receiver, and devices whereby when a predetermined quantity of water has been forced from the tank into the receiver the aforesaid valve or cock (which had been previously closed) will be opened, and at the same time the action of the pump will be arrested by the said float at a certain point in its descent, breaking a previously closed electric circuit, together with means for dividing the stream of water as it enters the receiver from the pump into a fine spray.

The invention consists also in certain special features and combinations and also in the particular construction of the spraying device, all of which will be hereinafter duly pointed out.

Referring now to the accompanying drawings, forming a part of this specification, 1 is a vessel which is charged with carbonic-acid or other gas under heavy pressure. This vessel has a stop-cock 2 for shutting off or allowing the escape of the gas and communicates by means of a pipe 3 with the upper part of the interior of a receiver 4. In this pipe I usually employ an equalizing-valve 5 for regulating the amount or pressure of the gas allowed to flow into the receiver in connection with a suitable gage $5^a$ for showing the amount of pressure. Such valves and gages being well known, a particular description thereof is not deemed necessary.

6 is a tank into which enters a pipe 7, that leads to a source of water-supply, the water being preferably passed through a filter 8 on its way to the tank.

9 is a ball-float within the tank on the end of an arm 10, that is pivoted to the upper part of the latter.

11 are conductors leading from a source of electrical energy to a knife of other suitable switch 12, from one of the poles of which leads a conductor 13 to a rheostat or motor-starter 14, having a pivoted arm $14^a$, controlled by a spring $s$ and an electromagnet $14^b$, interposed in the circuit. 15 is a conductor leading from the other pole of the switch to the motor 16, the shaft $16^a$ of which is connected to a pump 17. $13^a$ are conductors leading from the rheostat to the motor.

The pump communicates by a pipe 18 from the bottom of the tank 6 and by a pipe $18^a$ with the interior of the receiver.

The arm $14^a$ of the rheostat is pivotally connected by a rod or bar 19 with the arm $19^a$ of a stop-cock 20 in the water-supply pipe 7.

The pivoted switch-lever $12^a$ is connected by a chain or cord 21 with the ball-float 9, or rather, in the present instance, with an arm $9^a$ on the pivot of the float-arm 10.

On the end of the pipe $18^a$, within receiver 4, is the spraying device 22, which consists of a body portion $22^a$, with two L-shaped passage-ways $22^b$, whose horizontal portions are directed toward and in proximity with each other, as seen most clearly in the sectional view, Fig. 2. In order to permit the ready clearing-out or removal of obstructions that may lodge in these passage-ways, I employ removable screws or plugs 22ᶜ in the outer wall of the ways, at the bends thereof.

Having thus described the construction and arrangement of my apparatus and mechanism, I shall now explain the operation, as follows: It will be observed, as shown in Fig. 1 of the drawings, that the tank 6 is nearly full of water, which has been allowed to flow into the same by way of pipe 7, that the switch-lever 12ª has been brought into position by hand to close that part of the electrical circuit, and that the rheostat-arm 14ª has been brought, also by hand, into contact with the magnet 14ᵇ and is held thereby against the stress of the spring s, in which position of the arm the circuit to the pump-motor is completed and the supply of water is cut off by the cock 20 of pipe 7. The pump being thus set in motion takes water from tank 6 and forces the same into receiver 4 through the L-tubes of the spraying device 22, which divides the water into two streams. As these streams come into contact with each other they are divided by the impact into an exceedingly fine spray, whereby an abnormally large quantity of the gas contained in the receiver is absorbed, and thus the water is thoroughly carbonated. Any air which may be set free from the water within the receiver and which rises to the upper part thereof may be allowed to escape through a vent-cock c. As the level of the water in tank 6 falls and the float 9 of course descending the arm 9ª draws upon the chain 21 and so pulls down the switch-lever 12ª, which breaks the electrical circuit, whereupon the pump-motor comes to a stop and the magnet 14ᵇ, losing its energy, permits the spring s to draw back the rheostat-arm, which thereupon, through the rod connection 19, actuates the arm 19ª and thus opens the cock 20. These positions assumed by the float, switch-arm, rheostat-arm, &c., are indicated by dotted lines in Fig. 1. When the tank has again been filled, the switch 12ª and then the rheostat-arm 14ª are shifted to the positions respectively shown in full lines in Fig. 1, and the pump-motor is again put in action, and when the water has been drawn from the tank the foregoing automatic operations are repeated. In order to avoid waste of water in the interval before again shifting the switch-arm and the rheostat-arm into position to close the circuit, I usually place within the end of the pipe 7, where it enters the tank, a cock or valve of usual construction and connect the same with the float-arm in such manner that when the float is at its highest point the valve will be closed and thus the inflow of the water stopped, and which valve will be operated as the float descends.

When it is desired to draw the gas-charged water from the receiver, a cock 23 in a pipe 24, leading from the interior of the receiver to the soda-fountain, (not shown,) may be opened. In practice I would usually employ more than one receiver—as, for example, as in Fig. 1 of the drawings, in which there is shown a second receiver 4ª and a third 4ᵇ. In such case I would arrange the said pipes as shown—that is to say, with a branch pipe 25 from the main water-pipe 18ª from the pump to the second receiver and a similar branch 25 to the third receiver. I would also have branch pipes 26 from the main gas-pipes 3 to the additional receivers, respectively. The second receiver would also have an outlet-pipe 27, connected by a pipe 28 to the outlet-pipe 24 of the first receiver, with a suitable stop-cock 29 in the said connecting-pipe 28, whereby the contents of either of the two receivers could be allowed to pass into a common pipe from the connection 28 to the soda-fountain. Thus one of the receivers may be kept filled with the gas-charged water as a reserve. The first two receivers would be used for soda-water and the third for some other purpose—such, for example, as for mineral water, if desired. In such case, however, I would employ suitable check-valves in the branch gas-pipes leading to the receivers, respectively, whereby while the gas may be allowed to enter the receivers, respectively, it is prevented from flowing back through the said pipes.

I am aware that there has been described an automatic fire-extinguisher device having oppositely-disposed discharge-openings, whereby two streams of liquid issuing from openings are adapted to impinge against each other, and I do not therefore claim to have been the first inventor of such a device *per se*.

I further remark that I do not confine myself to the precise construction of the several parts of my invention or apparatus as hereinbefore described and as illustrated in the drawings, as the same may be modified by a mechanic or other person skilled in the art without departing from the principles of the invention.

Having thus described my invention, I claim as new and desire to secure by Letters Patent—

1. In an apparatus of the character recited, the combination, of a receiver adapted to communicate with a supply of gas under pressure, a tank adapted to communicate with a source of water-supply, a pump communicating with said tank and with a suitable spraying device within said receiver, the electric motor for actuating said pump, a switch between the motor and the source of electrical energy for closing and breaking the circuit, means for causing said switch to break the circuit when the level of the water within said tank has fallen a predetermined distance, and the rheostat adapted to turn on the supply of water to said tank when the electrical circuit is broken by the said switch, all constructed, arranged and adapted to operate substantially as and for the purpose set forth.

2. The combination of the tank, the pipe leading therefrom to a source of water-supply, the stop-cock in said pipe, a suitable float within the tank, the pump communicating with the latter, the motor for said pump adapted to be driven from a source of electrical energy, the switch connected with and operated by said float and adapted to close and break the circuit between said motor and the source of energy, together with the rheostat having the electromagnet and the spring-controlled arm connected with the stop-cock in the water-supply pipe, substantially as and for the purpose set forth.

3. In an apparatus of the character described, the combination of the pump, the tank communicating therewith, the electric motor, the conductors leading therefrom to a source of electrical energy, the float within said tank, the pivoted arm connected with said float, the switch, a flexible connection between said arm and the switch, the pipe communicating between said tank and a source of water-supply, the stop-cock in said pipe, the rheostat having the pivoted spring-controlled arm connected with said cock, together with the electromagnet, all constructed, arranged and adapted to operate substantially in the manner and for the purpose set forth.

4. The combination of the closed tank, means for supplying the gas under pressure thereto, the spraying device within said tank having the outlet-openings adjacent to and facing each other, and means for supplying water or the like under pressure to said spraying devices, substantially as and for the purpose set forth.

5. The combination of the closed tank, means for supplying gas under pressure thereto, the spraying device within said tank composed of the body portion communicating with the inlet-pipe of a source of water-supply under pressure and having the two L-shaped passage-ways with their exits adjacent to and facing each other, substantially as and for the purpose set forth.

In testimony whereof I have hereunto affixed my signature this 15th day of December, A. D. 1897.

FISHER H. LIPPINCOTT.

Witnesses:
JOSHUA PUSEY,
WALTER C. PUSEY.